Figure 3:
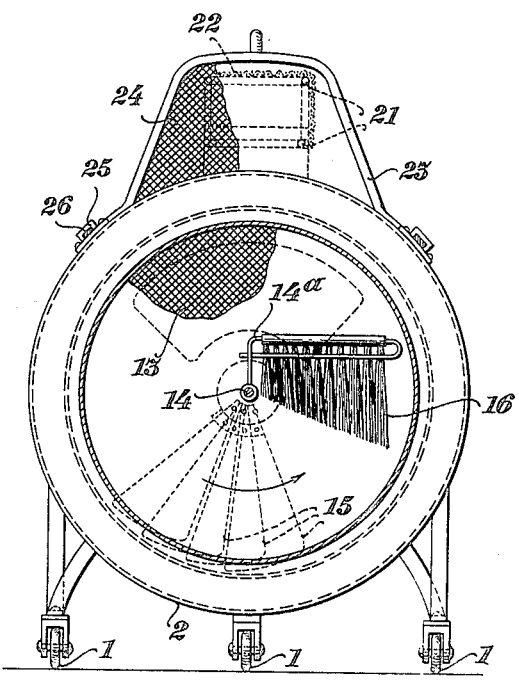

G. SUPANZ.
VACUUM CLEANER.
APPLICATION FILED MAY 7, 1914.
1,134,294.
Patented Apr. 6, 1915.
2 SHEETS—SHEET 1.
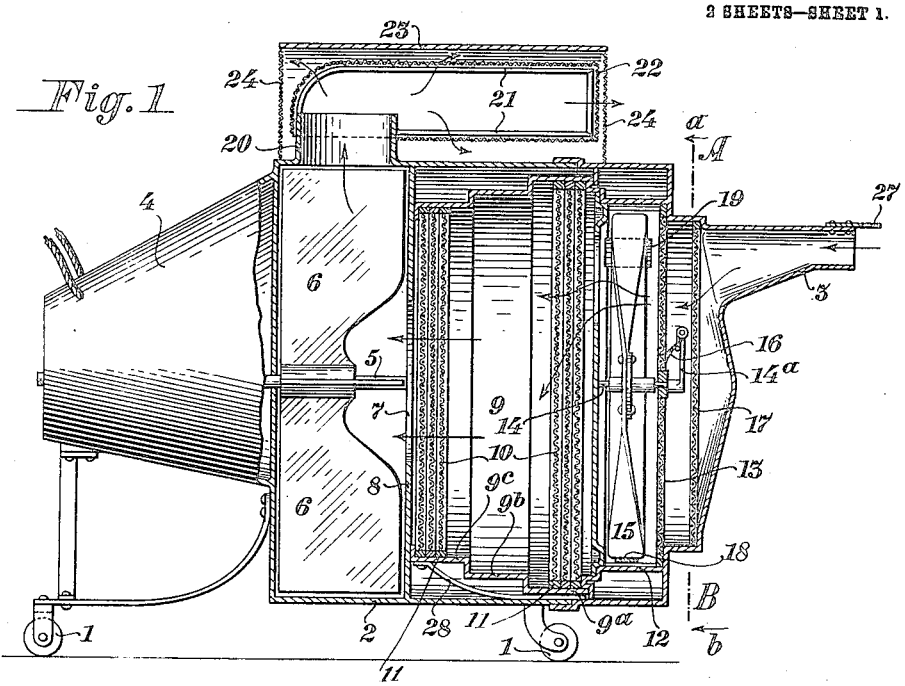
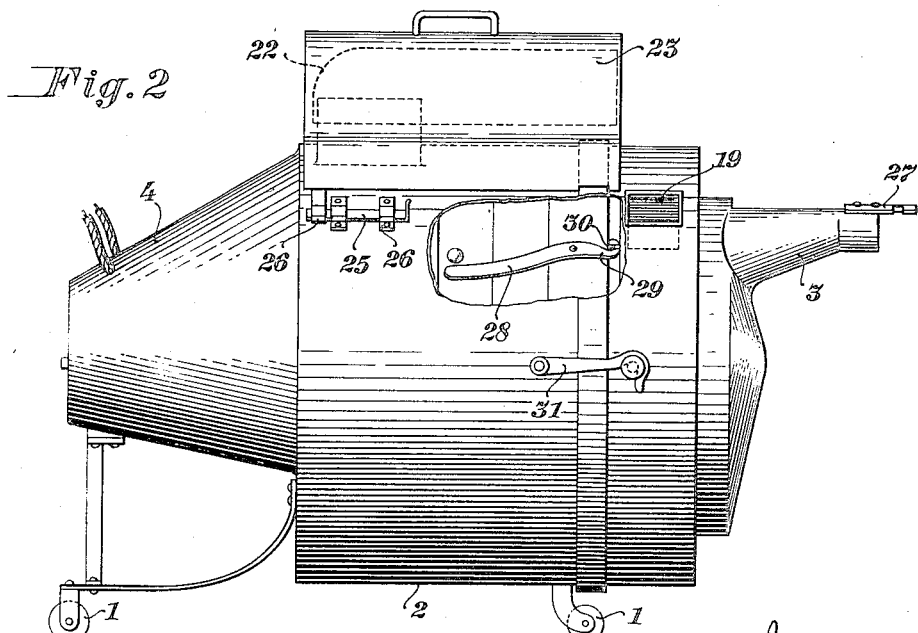

UNITED STATES PATENT OFFICE.

GEORG SUPANZ, OF VIENNA, AUSTRIA-HUNGARY.

VACUUM-CLEANER.

1,134,294.             Specification of Letters Patent.        Patented Apr. 6, 1915.

Application filed May 7, 1914. Serial No. 837,091.

*To all whom it may concern:*

Be it known that I, GEORG SUPANZ, painter on enamel, and a subject of the Emperor of Austria-Hungary, residing at Heindlgasse 3, Vienna, XVI, Austria-Hungary, have invented certain new and useful Improvements in Vacuum-Cleaners, of which the following is a specification.

This invention relates to apparatus for removing dust and the like from carpets and other objects by suction, and its object is to effect certain improvements in apparatus of this class.

One part of the invention consists in providing, in combination with a sieve through which the stream of air is drawn, a vane-wheel carrying a brush whereby the sieve is swept, the wheel being turned by the stream of air.

The invention also includes various improvements in the arranging and mounting of the sieves, as will be described hereinafter.

An embodiment of the invention is shown in the accompanying drawings, in which:—

Figure 1 is a vertical longitudinal section, Fig. 2 an elevation, with part of the casing broken away, and Fig. 3 a section on the line A—B of Fig. 1, viewed in the direction of the arrows $a$, $b$.

The apparatus is mounted on wheels or rollers 1, which support a cylindrical casing 2, provided in front with a cover having a nozzle 3, and at the rear with a housing 4 for an electric motor; the motor is not shown in the drawings.

A horizontal shaft 5 driven by the motor carries a fan 6, the vanes of which are adapted to draw a stream of air through a hole 7 in a vertical wall 8 in the casing. On the other side of this wall the casing 2 contains a stepped cylindrical sieve holder 9, which is removable from the casing and comprises three parts $9^a$, $9^b$, $9^c$, of different diameters, the part $9^c$ of smallest diameter being nearest the hole 7, and the part $9^a$ of largest diameter being nearest the nozzle 3.

The sieve holder contains three groups of circular sieves 10, one group in each of the parts $9^a$, $9^b$, $9^c$. The sieves in each group are of equal mesh, but the coarseness of mesh of the several groups decreases in direction of the stream of air under suction. The sieves have rims 11, whereby the sieves in each group are slightly spaced apart. At the intake end of the sieve holder 9 there is a hollow cylindrical cover 12, forming part of the casing and fitted with a coarse detachable sieve 13. A short shaft 14 is mounted at the center of the sieve 13, and has mounted upon it a light vane wheel 15 within the cover 12, between the sieves 13 and 10, and the shaft 14 has a crank $14^a$ in front of the sieve 13, to which is fitted a detachable brush 16, adapted to sweep the sieve 13. Between the nozzle 3 and the sieve 13 there is a sieve 17, coarser than the sieve 13. One vane of the vane wheel 15 carries a conspicuously colored or white plate 18, which in the course of the rotation of the wheel is carried past a window 19 provided in the wall of the cover 12.

Above the fan 6 the casing has an outlet duct 20, to which is joined a horizontal framework 21 of wire, forming a support for a filter bag 22 under a removable cover 23, the front and rear walls of which consist of sieves 24. The cover 23 is fixed to the casing 2 by means of bolts 25, which engage eyes 26 fixed to the cover and casing respectively.

The nozzle 3 has a hook 27 for attaching a suction pipe so that it will not slip off when pulled.

For fixing the cover 12, arms 28 are pivoted to the sieve holder 9, and terminate in hooks 29 adapted to engage hooks 30 on the rim of the cover. The cover 12 is attached to the casing by hooks 31.

The action of the apparatus is as follows:—The motor drives the fan 6 at high speed, and the fan draws a stream of air through the nozzle 3, and screens 17, 13 and 10. This stream of air rotates the vane wheel 15, with the brush 16. Coarse impurities such as fragments of wood, tobacco and the like carried by the air stream are retained by the sieve 17. The sieve 13 retains impurities of a less coarse nature and is continually swept by the brush 16, by which it is kept clear for the passage of dust to the sieves 10. In proportion as the sieves 10 in the part $9^a$ of the holder 9 become clogged with dust, the speed of the vane wheel 15 decreases, until the wheel ultimately stops. The reduction of speed and stoppage can be observed through the window 19, through which the plate 18 can be seen, and the user of the apparatus is thus enabled to judge when the sieves 10 require to be attended to. For this purpose he detaches the cover 12, and takes out the first sieve 10 of the group in the part 9ª, and whatever other sieves 10 may be clogged. This operation may be repeated after the cleaning operation has been continued for a while.

Of course the sieves 10 nearer the nozzle 3 become clogged sooner than those which are more remote. The sieves in the first group must be taken out and cleaned or changed more often than those in the middle group, and the latter must be cleaned or changed more often than those in the last group. As the sieves 10 are of different sizes, each fitting into a particular part of the holder, no mistake is liable to occur in regard to the position in which the sieves are re-inserted. The sieves belonging to the different groups may also be differently colored. As the sieves are spaced apart by their rims 11 they may be used in a wet state, for example saturated with a disinfectant solution, without detracting from their efficiency as filters.

The apparatus can be pulled along the ground by means of the pipe or flexible hose joined to the nozzle 3, and is not liable to fall over, the cylindrical casing being horizontal.

What I claim as my invention and desire to secure by Letters Patent of the United States is:—

1. In a vacuum cleaner the combination of a sieve, a vane wheel adjacent the rearward side of said sieve and adapted to be rotated by a stream of air passing through said sieve, and a brush connected to said vane wheel and sweeping the forward side of said sieve.

2. In a vacuum cleaner the combination with a casing, of a cover having a window, a sieve in said casing, a vane wheel adjacent the rearward side of said sieve and adapted to be rotated by a stream of air passing through said sieve, said vane wheel being visible through said window, and a brush connected to said vane wheel and sweeping the forward side of said sieve.

3. In a vacuum cleaner the combination of a casing having a detachable cover, a series of fine sieves in said casing, a coarse sieve in said cover, means for drawing a stream of air through said coarse sieve and fine sieves in series, a vane wheel mounted in said cover, and a brush connected to said vane wheel sweeping said coarse sieve.

4. In a vacuum cleaner the combination of a casing having a detachable cover, a series of fine sieves in said casing, a coarse sieve in said cover, means for drawing a stream of air through said coarse sieve and fine sieves in series, a vane wheel mounted in said cover, and a brush connected to said vane wheel sweeping said coarse sieve, said fine sieves being divided in groups whose fineness of mesh increases in the direction of the stream of air.

5. In a vacuum cleaner the combination of a casing having a detachable cover, a series of fine sieves in said casing, a coarse sieve in said cover, means for drawing a stream of air through said coarse sieve and fine sieves in series, a vane wheel mounted in said cover, and a brush connected to said vane wheel sweeping said coarse sieve, said fine sieves having rims whereby they are slightly spaced apart.

GEORG SUPANZ.

Witnesses:
 KARL HEISLER,
 AUGUST FUGGER.